(12) United States Patent
Teng (10) Patent No.: US 10,646,089 B2
(45) Date of Patent: May 12, 2020

(54) TOUCH SENSING DEVICE AND ROBOT (71) Applicant: SHENZHEN SILVER STAR INTELLIGENT TECHNOLOGY CO., LTD., Shenzhen (CN)

(72) Inventor: Wenhai Teng, Shenzhen (CN)

(73) Assignee: Shenzhen Silver Start Intelligent Technology Co., Ltd., Shenzhen, Guangdong Province (CN)

( * ) Notice: Subject to any disclaimer, the term of this patent is extended or adjusted under 35 U.S.C. 154(b) by 231 days.

(21) Appl. No.: 15/740,545

(22) PCT Filed: Aug. 24, 2017

(86) PCT No.: PCT/CN2017/098866
§ 371 (c)(1),
(2) Date: Dec. 28, 2017

(87) PCT Pub. No.: WO2018/049972
PCT Pub. Date: Mar. 22, 2018

(65) Prior Publication Data
US 2018/0310792 A1 Nov. 1, 2018

(30) Foreign Application Priority Data
Sep. 13, 2016 (CN) .................. 2016 2 1051503 U (51) Int. Cl.
*A47L 11/40* (2006.01)
*A47L 11/24* (2006.01)
(Continued)

(52) U.S. Cl.
CPC ........... *A47L 11/4008* (2013.01); *A47L 11/24* (2013.01); *A47L 11/4061* (2013.01);
(Continued)

(58) Field of Classification Search
CPC .. A47L 11/40; A47L 11/4008; A47L 11/4061; A47L 2201/04; B60R 19/26; B60R 19/483; B62D 57/032
See application file for complete search history.

(56) References Cited

U.S. PATENT DOCUMENTS 6,941,199 B1 * 9/2005 Bottomley ........... G05D 1/0221
701/23
7,761,954 B2 * 7/2010 Ziegler ..................... A47L 5/14
15/320
(Continued)

FOREIGN PATENT DOCUMENTS

CN 1568156 A 1/2005
CN 1575722 A 2/2005
(Continued)

*Primary Examiner* — Joseph M Rocca
*Assistant Examiner* — Michael R Stabley
(74) *Attorney, Agent, or Firm* — Rosenberg, Klein & Lee (57) ABSTRACT

A touch sensing device of a robot, comprising an inner housing and an outer housing continuously surrounds the inner housing at least at the side face of the inner housing. At least one resilient member used for maintaining an even moving gap between the outer housing and the inner housing and at least one sensing switch used for detecting relative displacement between the outer housing and the inner housing are disposed between the outer housing and the inner housing. The disclosure further provides a robot for mounting the touch sensing device. Since the outer housing surrounds the inner housing, no matter what portion of the robot is colliding with the obstacle, relative displacement occurs between the inner housing and the outer housing, and the robot can detect the collision. Thus the outer housing can provide buffering function from 360° perspective around the robot and detect the touched obstacle.

17 Claims, 8 Drawing Sheets

(51) Int. Cl.
  *B60R 19/26* (2006.01)
  *B60R 19/48* (2006.01)
  *B62D 57/032* (2006.01)

(52) U.S. Cl.
  CPC ............ *B60R 19/26* (2013.01); *B60R 19/483* (2013.01); *B62D 57/032* (2013.01); *A47L 2201/04* (2013.01)

(56) References Cited

U.S. PATENT DOCUMENTS

| | | | |
|---|---|---|---|
| 8,950,792 B2* | 2/2015 | Hickey | B60R 19/483 |
| | | | 293/4 |
| 2004/0049877 A1* | 3/2004 | Jones | A47L 5/30 |
| | | | 15/319 |
| 2005/0021181 A1* | 1/2005 | Kim | A47L 9/009 |
| | | | 700/245 |
| 2014/0138964 A1* | 5/2014 | Shin | B25J 19/0091 |
| | | | 293/117 |
| 2017/0156560 A1* | 6/2017 | Jung | A47L 9/16 |
| 2017/0181591 A1* | 6/2017 | Tanaka | A47L 9/00 |

FOREIGN PATENT DOCUMENTS

| | | | | |
|---|---|---|---|---|
| CN | 2751733 | Y | 1/2006 | |
| CN | 1889878 | A | 1/2007 | |
| CN | 100466958 | * | 3/2009 | ............ A47L 11/33 |
| CN | 202739925 | U | 2/2013 | |
| CN | 204989972 | U | 1/2016 | |
| JP | 2005211494 | A | 8/2005 | |

* cited by examiner

TOUCH SENSING DEVICE AND ROBOT

CROSS REFERENCE

This application is continuation of, and claims the benefit of priority from the International Application PCT/CN2017/098866, filed Aug. 24, 2017, which claims the benefit of priority from Chinese Patent Application No. CN201621051503.2, filed with the Chinese patent office on Sep. 13, 2016, the entire contents of all of which are incorporated herein by reference.

TECHNICAL FIELD

The disclosure relates to a robot which can freely move, and more specifically to a touch sensing device of a robot and a robot having the touch sensing device.

BACKGROUND

A moving robot is a device which can freely move on the floor, which includes all kinds of sensing devices so as to avoid colliding with obstacles in work environment. A majority of moving robots have a bumper at its front portion for detecting obstacles. There is a appropriate moving space between the bumper and the robot main body, so when the bumper is colliding with an obstacle, the bumper can buffer the shock on the robot main body, and can detect the collision between the robot and the obstacle in front of the robot, so that the robot can change moving direction and avoid the obstacle. However, bumpers of currently a majority of moving robots only surrender front regions of the robots, at most in a range of 180°, without involving rear regions of the robots, so that the robots can not detect the collision at the rear regions when they retreat. As the bumper only surrenders a limited range around the robot, disconnected visual effect exists between the rear portions of the two side of the bumper and the robot main body, which impacts integrity of appearance.

SUMMARY

The disclosure aims to overcome at least one of the shortcomings of the existing technology, and provides a touch sensing device, which is able to provide buffer effect around the robot in 360° range and detect touches. Embodiments of the disclosure provide technical solutions as following:

In a aspect, the disclosure provides a touch sensing device of a robot, the touch sensing device comprising an inner housing and an outer housing continuously surrendering the inner housing at least at the side face of the inner housing, at least one resilient member and at least one sensing switch disposed between the inner housing and the outer housing, the at least one resilient member being for maintaining a even moving gap between the inner housing and the outer housing, the at least one sensing switch being for detecting the relative displacement between the inner housing and the outer housing. As the outer housing surrenders the inner housing, whatever which portion of the housings of the robot is colliding with the obstacle during moving process, the relative displacement will occur between the inner housing and the outer housing. Since the at least one sensing switch can detect the displacement between the inner housing and the outer housing, the robot can detect the collision of the obstacle. The robot can change the moving direction to avoid the obstacle. Thus the outer housing is able to form a integrated protection in 360° range around the robot to provide the buffering function and detect the obstacle that has been touched, overcoming deficiencies of the prior art.

Specifically, the at least one sensing switch comprises at least one selected from combination consisting of a microswitch, a proximity sensor, a photoelectric switch and a thin film switch, and also other device or component which has the same function. The at least one sensing switch can be chosen according to sensitivity need of engineering design or market cost or structural design need.

Specifically, the at least one resilient member is at least one selected from combination consisting of a spring, a elastic sheet and a resilient buffer layer, and also other device or component which has the same function. The resilient member can be chosen according to sensitivity need of engineering design or market cost or structural design need.

In an embodiment, the at least one the resilient member is in a strip shape, and comprises a sleeve, a compression spring disposed in the sleeve and a slide rod, one end of which extends into the sleeve and connects to the compression spring, wherein both ends of the at least one resilient member are pivotally connected to the outer housing and the inner housing respectively.

In an embodiment, the at least one sensing switch comprises a plurality of sensing switches, which are disposed relative to the outer housing or symmetrically disposed in pair.

In an embodiment, the at least one sensing switch comprises a plurality of resilient members, which are symmetrically disposed on both sides of the longitudinal axis of the robot.

In an embodiment, the at least one resilient member is in a strip shape, and comprises a sleeve, a compression spring disposed in the sleeve and a slide rod, one end of which extends into the sleeve and is connected to the compression spring, wherein both ends of the resilient member are pivotally connected to the outer housing and the inner housing respectively. at least one resilient member comprises a plurality of the resilient members. Preferably, at least one resilient member comprises four resilient members. The at least one resilient members and/or the at least one sensing switches symmetrically disposed on both sides of the longitudinal axis of the robot.

Specifically, the angle formed by the resilient members on both sides of the longitudinal axis of the robot is a reflex angle, and the orientation of the reflex angle is the front of the robot. Preferably, the orientation of the reflex angle is right the front of the robot.

In an embodiment, the outer housing is in the form of an integral ring.

In an embodiment, the sensing switch comprises a swing rod at least partially lightly attached to the outer housing or the inner housing for completing electronic trigger and a spring acting on the swing rod to help the swing rod recover, wherein the at least one sensing switch and the at least one resilient member are evenly distributed between the outer housing and the inner housing.

In other aspect, the embodiment of the disclosure provides a robot, wherein the robot comprises a robot main body, a walking device disposed on the robot main body and a touch sensing device; wherein the touch sensing device comprises an inner housing and an outer housing, and the outer housing continuously surrenders the inner housing at least at the side face of the inner housing; at least one resilient member and at least one sensing switch are disposed between the inner housing and the outer housing, the at least one resilient member is used for maintaining a moving gap between the inner housing and the outer housing, and the at least one sensing switch is used for detecting relative displacement between the inner housing and the outer housing.

In an embodiment, the robot main body comprises a base tray and a top cover which are arranged opposite to each other, and the inner housing of the touch sensing device is disposed on the base tray or integrally formed with the base tray.

In an embodiment, the robot main body comprises a base tray and a top cover which are arranged opposite to each other, wherein the top cover is arranged to: when the outer housing of the touch sensing device is colliding with an obstacle, the top cover is able to move together with the outer housing of the touch sensing device.

In an embodiment, the robot main body comprises a base tray and a top cover, and the top cover is integrally formed with the outer housing of the touch sensing device.

In an embodiment, a rolling component is disposed between the robot main body and the outer housing of the touch sensing device, for reducing the frictional force with the robot main body when the outer housing is moving.

In an embodiment, the rolling component is a round ball capable of rolling in all directions in original position.

In an embodiment, the robot main body comprises a base tray and a top cover which are arranged opposite to each other, and the inner housing of the touch sensing device is disposed on the base tray or integrally formed with the base tray, and the outer housing of the touch sensing device surrounds the side face of robot main body at least one circle to form a ring shape or spiral shape.

In an embodiment, the at least one resilient members and/or at least one sensing switches respectively comprise a plurality of resilient members and/or sensing switches evenly distributed on one side of the outer housing close to the inner housing. wherein the plurality of sensing switches are at least disposed on the front portion of the robot.

In an embodiment, the resilient member is in a strip shape, and comprises a sleeve, a compression spring disposed in the sleeve and a slide rod, one end of which extends into the sleeve and is connected to the compression spring, wherein both ends of the resilient member are pivotally connected to the outer housing and the inner housing respectively.

In an embodiment, the angle formed by the resilient members on both sides of the longitudinal axis of the robot is a reflex angle, and the orientation of the reflex angle is the front of the robot.

In an embodiment, the at least one sensing switch comprises a swing rod at least partially lightly attached to the outer housing or the inner housing for completing the electronic trigger and a spring acting on the swing rod to help the swing rod recover; wherein the at least one sensing switch and the at least one resilient member are evenly distributed between the outer housing and the inner housing.

According to the above technical solutions, the disclosure at least provides the advantageous effects as follows: the touch sensing device and the robot in the embodiments of this disclosure are capable of providing buffering function in 360° range around the robot and detecting touched obstacles, which overcomes deficiencies of the prior art, is easy for being integrally formed, simplifies the manufacturing processes and improves integrality of the appearance of the product.

BRIEF DESCRIPTION OF THE DRAWINGS

In order to clearly describe embodiments of the disclosure or the technical solution of prior art, the drawings combined by embodiments have been described simply hereinafter. Obviously, the drawings in the description are merely some embodiments of this disclosure. Variations can be made to the disclosure according to these drawings by an ordinary person skilled in the art without the creative work.

DETAILED DESCRIPTION

Hereinafter, the disclosure will be explained in detail with reference to the accompanying drawings. Obviously, the embodiments described below are merely some preferable ones, not all embodiments. All other embodiments made by an ordinary person skilled in the art based on the principles of the disclosure without creative work fall in the scope of the claims.

Figure 1:
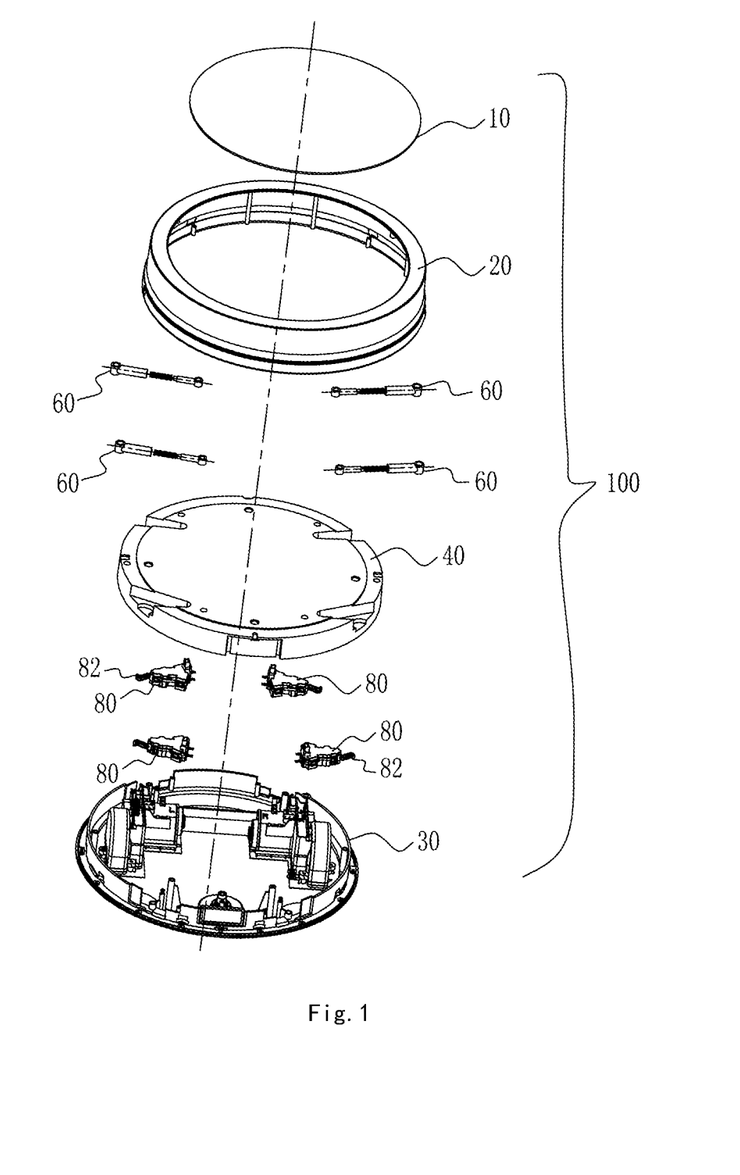
FIG. 1 is an exploded schematic view of a cleaning robot according to an embodiment of the disclosure.
Figure 2:
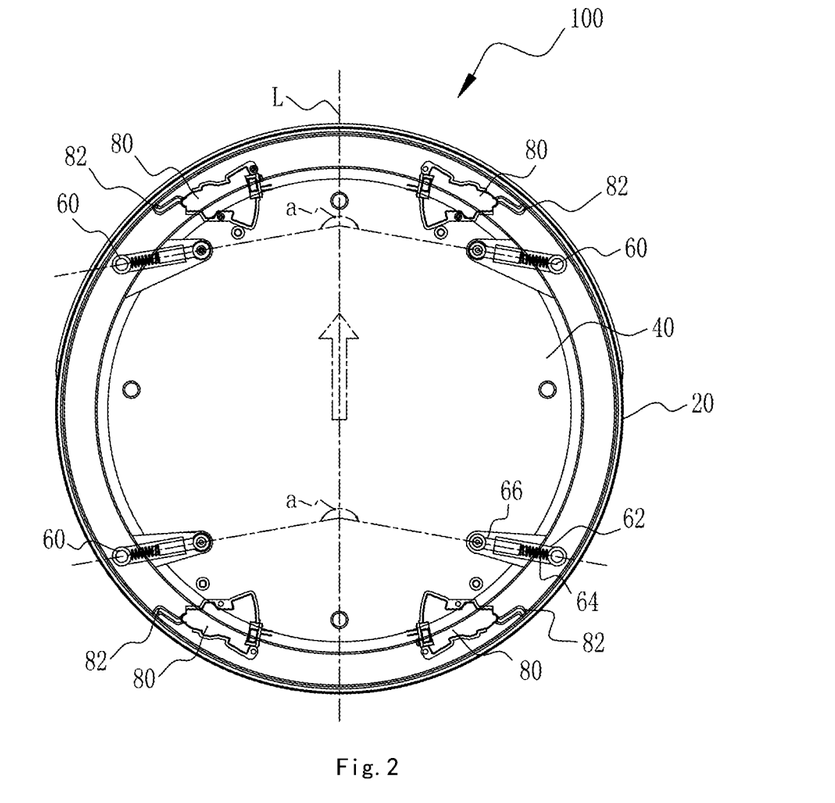
FIG. 2 is a schematic top plan view of the cleaning robot according to the embodiment of the disclosure.

Hereinafter, according to an embodiment of the disclosure, a cleaning robot is taken for example to describe the touch sensing device in detail. FIG. 1 is an exploded schematic view of a cleaning robot 100 according to an embodiment of the disclosure. FIG. 2 is a schematic top plan view of the cleaning robot according to the embodiment of the disclosure. The robot 100 has a touch sensing device 100 described in the embodiment of the disclosure. The touch sensing device comprises outer housing 20 and inner housing 40. In this embodiment, the outer housing 20 is in a round ring shape with a continuous side face to form the side face of the robot 100. The inner housing 40 matches with a base 30 of the robot 100 to form a portion of the main body of the robot 100. In an embodiment, the inner housing 40 and the base 30 of the robot 100 are formed integrally. The robot 100 further comprises a top cover 10. In other embodiment, the top cover 10 may be integrally formed with the outer housing 20, but in this embodiment, in order to easily change different top covers 10, the top cover 10 and the outer housing 20 are respectively designed to independent parts. The outer housing 20 continuously surrenders the inner housing 40 at least at the side face of the inner housing 40, and resilient members 60 and sensing switches 80 are disposed between the outer housing 20 and inner housing 40. The resilient members 60 and the sensing switches 80 are disposed between the outer housing 20 and inner housing 40, which includes but not limit to the following situations: 1)

the resilient members 60 and the sensing switches 80 are located between the outer housing 20 and the inner housing 40; 2) the resilient members 60 and/or the sensing switches 80 are mounted on the inner housing 40, but a portion of the resilient members 60 and/or the sensing switches 80 is located between the outer housing 20 and the inner housing 40; 3) the resilient members 60 and/or the sensing switches 80 are mounted on the outer housing 20, but a portion of the resilient members 60 and/or the sensing switches 80 is located between the outer housing 20 and the inner housing 40; 4) the resilient members 60 and/or the sensing switches 80 are mounted on the outer housing 20 and the inner housing 40. The resilient members 60 are used for maintaining a moving gap between the outer housing 20 and the inner housing 40, and the sensing switches 80 are used for detecting the relative displacement between the outer housing 20 and the inner housing 40. The sensing switches include electronic trigger switches. The sensing switches 80 are usually electrically connected to a processor or a control system (not shown) of the robot 100, so as to collect data of the sensing switches 80, thereby controlling the robot 100 to make response. The base 30 of the robot 100 is equipped with driving wheels, so as to be easy to move on the floor. Since the outer housing 20 surrenders the inner housing 40, whatever which portion of the outer housing 20 of the robot 100 is colliding with a obstacle during moving process, the relative displacement will occur between the outer housing 20 and the inner housing 40. Since the sensing switches 80 can detect the displacement between the outer housing 20 and the inner housing 40, so that the robot 100 can detect the collision with the obstacle. The robot 100 can change the moving direction to avoid the touched obstacle or take other response measures. The resilient members between the outer housing 20 and the inner housing 40 may buffer the shock effect when the robot is colliding with the obstacle, thus the outer housing 20 is able to offer buffering function in 360° range around the robot and detect the touched obstacle, overcoming the deficiencies of the prior art. Moreover, the outer housing 20 provides an all-round protection around the robot 100, and forms a continuous surface around the robot 100, so that the integrality of the appearance of the robot is better. During manufacture, since the side face of the outer housing is continuous and is not broken, the outer housing is not easily deformed during molding. The continuous structure of the side face prevents dust, spray, debris and the like from the side face from entering the robot main body to some extent.

In an embodiment, the resilient members 60 and/or the sensing switches 80 are symmetrically disposed on both sides of the longitudinal axis L of the robot 100. The sensing switches 80 may be photoelectric switches, each one of which includes a swing rod 82. The photoelectric switches are mounted on the inner housing 40 by screws, the swing rod 82 extends toward the inner surface of the outer housing 20 and is lightly attached to the outer housing 20 (in other embodiments, the photoelectric switches may also be screw-mounted on the outer housing and the swing rod is lightly attached to the inner housing). When the outer housing 20 collides, if the shock impact force is sufficient to cause the outer housing 20 and the inner housing 40 to move relative to each other, the swing rod 82 of the photoelectric switch 80 is touched and the swing rod 82 completes the electronic triggering function, thereby completing the touch sensing function. When the robot no longer touches the obstacle, the swing rod 82 can recover by a spring (not shown) in the photoelectric switch, after the swing rod 82 finishes triggering the photoelectric switch by displacement. Since the swing rod 82 is attached to the inner surface of the outer housing 20, the recovery of the swing rod 82 can also have an effect to recover the outer housing 20.

In other embodiment, the sensing switches 80 may also be microswitches or proximity sensors, or other devices or components which have the same function. The sensing switches can be chosen according to sensitivity need of engineering design or market cost or structural design need.

In other embodiment, the resilient members 60 may also be springs or spring sheets or resilient buffer layers, or other devices or components which have the same function. The resilient members can be chosen according to sensitivity need of engineering design or market cost or structural design needs.

Figure 3:
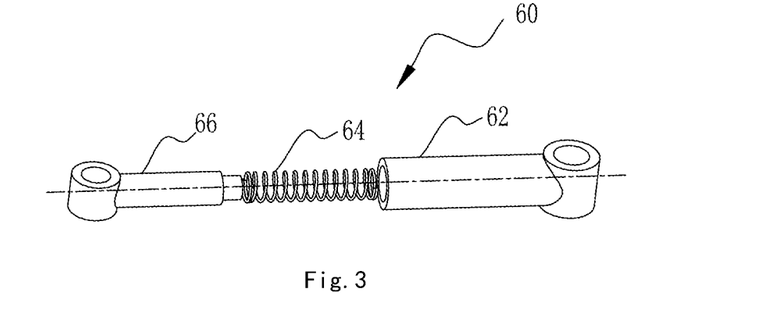
FIG. 3 is an exploded schematic view of a resilient member according to the embodiment of the disclosure.
Figure 4:
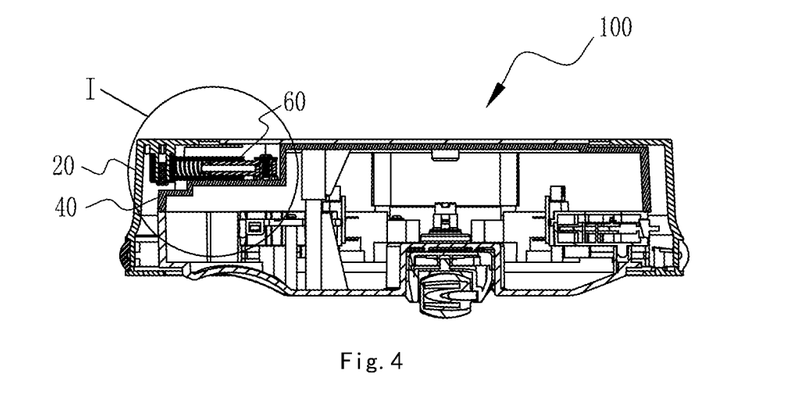
FIG. 4 is a schematic cross-section view of the cleaning robot according to the embodiment of the disclosure.
Figure 5:
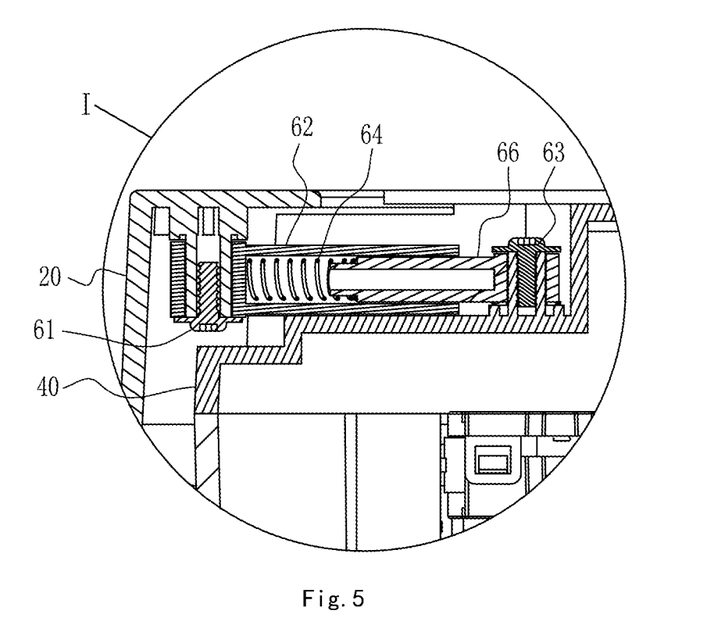
FIG. 5 is a schematic enlarged partial view of FIG. 4.

In this embodiment, referring to FIG. 1 to FIG. 3, there are 4 resilient members 60. The resilient member 60 is in a strip shape, and comprises a sleeve 62, a compression spring 64 disposed in the sleeve 62 and a slide rod 66. And one end of the slide rod 66 extends into the sleeve 62 and is connected to the compression spring 64, and both ends of the resilient member 60 are pivotally connected to the outer housing 20 and the inner housing 40 respectively. The slide rod 66 can slide within the sleeve 62 through overcoming the force of the compression spring 64 when being subjected to a suitable external force. The spring force of the compression spring 64 can acts on the sleeve 62 and the slide rod 66 to maintain an even moving gap between the outer housing 20 and the inner housing 40. The outer ends of the slide rod 62 and the sleeve 66 are provided with holes. In this embodiment, as shown in FIG. 4 and FIG. 5, the sleeve 62 is pivotally connected to the outer housing 20 by a screw 61. The slide rod 66 is pivotally connected to the inner housing 40 by a screw 63. The sleeve 62 can rotate around the screw 61 as a rotating shaft, and the slide rod 66 can rotate around the rotating screw 63.

Specifically, as shown in FIG. 2, the angle formed by the resilient members on both sides of the longitudinal axis of the robot 100 is a reflex angle α(an angle greater than 180° and less than 360° is a reflex angle), and the orientation of the reflex angle α is right the front of the robot (In FIG. 2, the indication direction of the hollow arrow is right the front of the robot, that is, the direction of the robot moving forward). Since the main motion of the robot 100 is moving forward, the designed angle can reduce the slide of the slide rod 66 within the sleeve 62 as much as possible when the robot is applied by force in the moving forward direction, so as to make the resilient member 60 rotate around the pivotal connection with the outer housing 20 and the inner housing 40, in order to reduce the triggering force and improve the sensitivity. In other embodiment, the resilient members 60 may also be disposed radially along the center of the robot (for example, the center of a circular robot is the center of a circle) as a reference point, and the extending line of the resilient members 60 along the length direction passes the center of the robot, but the triggering force is relatively large, that is, a relatively larger impact force is required to make the outer housing 20 and the inner housing 40 relatively move. In this embodiment, relatively small collisions may cause relative displacement between the outer housing 20 and the inner housing 40, so that the robot is easier to detect the collision with the obstacles during moving.

The touch sensing device and the robot provided in the embodiment of the disclosure are able to form a integrated protection in 360° range around the robot, so as to provide buffering function and detect the touched obstacle, thereby overcoming deficiencies of the prior art. Moreover the touch sensing device is easy to be integrally formed, which not only simplifies the manufacturing processes, but also improves integrality of the appearance of the product.

In addition to the cleaning robot disclosed in the embodiments of the disclosure, the technical solutions disclosed in the embodiments of the disclosure are also applicable to various robots that can move freely.

Additional embodiments are provided below to exemplify the disclosure. Unless especial stated, the following terms "front", "rear", "left" and "right" are all relative to the direction of the forward movement of the robot during normal working, and the term "front" refers to the forward movement of the cleaning robot. The terms "up", "down", "bottom" or "top" all refer to the placement status of the robot during normally working.

Figure 6:
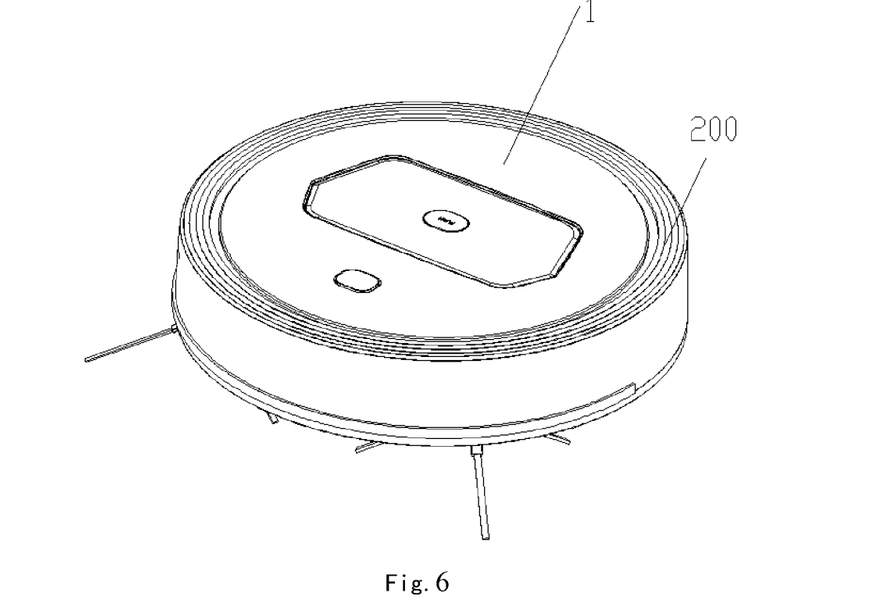
FIG. 6 is a schematic view of a robot according to an embodiment of the disclosure.
Figure 8:
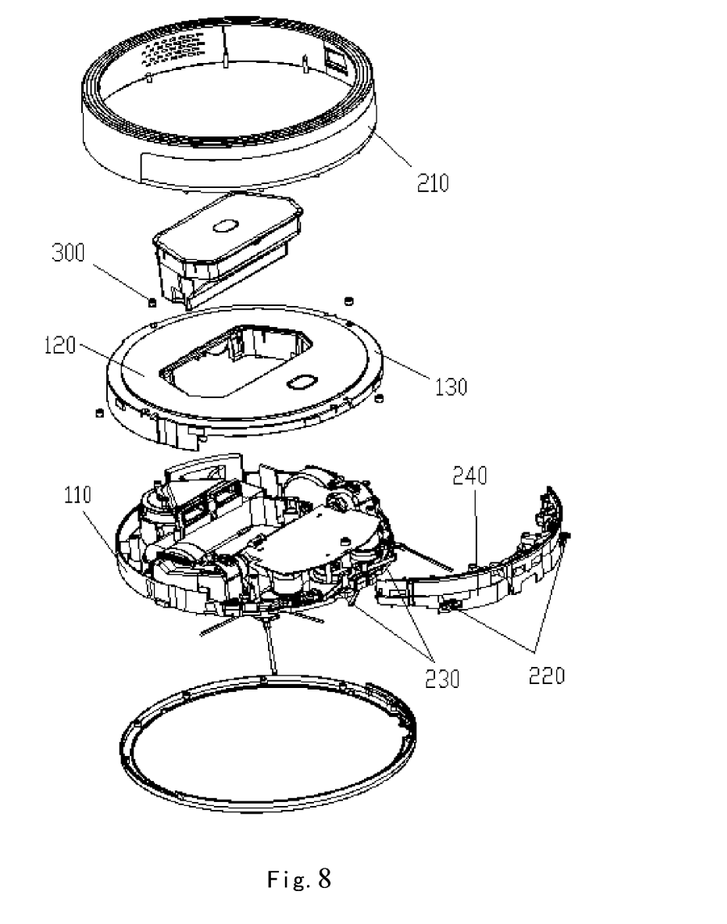
FIG. 8 is an exploded schematic view of the robot according to the embodiment of the disclosure.

FIG. 6 is a schematic view of a robot according to an embodiment of the disclosure. FIG. 8 is an exploded schematic view of the robot according to the embodiment of the disclosure. The embodiment of the disclosure provides a robot, which comprises robot main body 1 and touch sensing device 200. The robot main body 1 is equipped with a control system, used for control the touch sensing device 200 and other components. The robot further comprises moving components 50 disposed on the robot main body 1, which is used for moving the robot. For example, the moving components may be wheel components, crawler belts or robotic legs and the like. It can be understood that the robot further comprises a sensing system, for example, infrared sensors, laser range sensors and other range sensors, cameras, optical flow sensors, acoustic sensors, ultrasonic sensors. The robot may also include other functional components, such as cleaning components, cutting components, which are not described in further detail herein.

The touch sensing device 200 includes an outer housing 210 and sensing switches 220. The outer housing 210 surrounds at least one cycle (ie, a circle) of the robot main body 1. Alternatively, the outer housing 210 surrounds the robot main body 1 at least one cycle (namely a circle), that is, the outer housing 210 surrounds the robot main body 1 in at least 360° range. It can be understood that the outer housing 210 may be designed to surround the robot main body 1 twice, three cycles or more. Except for the robot as a cleaning robot, in other embodiments, the outer housing 210 also may be designed likewise. For example, in an embodiment of a humanoid robot, the outer housing 210 of the touch sensing device 200 surrounds the robot main body a plurality of circles from the bottom to the top or from the top to the bottom. For example, the touch sensing device 200 may be spirally disposed on the robot main body 1. In an embodiment, a plurality of sensing switches are evenly distributed on the robot main body 1 and/or the outer housing 210 correspondingly to the shape of the outer housing 210. That is, a plurality of sensing switches may be evenly distributed around the robot main body 1 one circle or more circles. It is understandable that a plurality of sensing switches may also be disposed only on the front portion or the back portion of the robot. Thus, since the outer housing 210 surrounds the robot main body 1 at least one cycle (ie, a circle), no matter what portion of the robot collides, the sensing switch will be triggered to make the robot make corresponding response, for example, retreating, and changing direction, so that the robot is more intelligent and can discriminate the collision position, thereby greatly reducing the sensing blind area when the robot collides and making the robot detect the obstacle more accurately and sensitively.

The sensing switch is selected from at least one from combination consisting of a light sensing switch, a microswitch, a proximity sensor, a photoelectric switch, a thin film switch and a capacitor.

When the outer housing 210 collides, at least one of the sensing switches 220 is triggered to provide a signal, and the control system controls the robot according to the signal. There can be one sensing switch 220 as well. When a plurality of sensing switches 220 are provided, the plurality of the sensing switches 220 are evenly distributed along the outer housing 210. Of course, the plurality of the sensing switches 220 may also be disposed at different portions of the outer housing 210 according to design requirements. It can be understood that the sensing switches 220 can also be at least disposed on the front half part or the rear half part, or any part of the robot. In an embodiment, the outer housing 210 may be designed as that at least the collided portion can moves with respect to the robot main body 1 when the outer housing 210 collides.

The sensing switches 220 are disposed on the robot main body 1 and/or the outer housing 210 to detect collision status of the touch sensing device 200.

In an embodiment, the outer housing 210 is a continuous unit. In another embodiment, the outer housing 210 includes a plurality of segments connected to each other by resilient members, such that each segment can move individually to help in determining force-enduring property of the corresponding portion of the outer housing 210, such as force-enduring position, angle, size and so on.

In an embodiment, the sensing switches 220 include a first portion and a second portion. The first portion is disposed on the robot main body 1, the second portion is disposed on the outer housing 210, and the second portion can move relative to the first portion. For example, the sensing switch 220 may be a capacitive sensing switch, the first portion is the first plate of the capacitive sensing switch and the second portion is the second plate of the capacitive sensing switch. When the touch sensing device 200 is colliding with obstacles, a relative movement occurs between the first plate and the second plate, which causes a change in capacitance to generate a signal, and the control system operates the robot according to the signal. For another example, the sensing switch 220 may be a Hall-effect switch. The coil of the Hall-sensing switch is disposed on the robot main body 1. The magnetic core is disposed on the outer housing 210. When the touch sensing device 200 is colliding with obstacles, a relative movement occurs between the magnetic core and the coil to generate a signal.

In an embodiment, the sensing switch 220 may be a microswitch, a thin film switch or a contact switch. The sensing switch 220 includes a first electrode and a second electrode. One from the first electrode and the second electrode is disposed on resilient material or connected to the resilient member, thereby at least the one can be movable and repositionable. In this embodiment, an insulating layer may be further disposed between the first electrode and the second electrode, and a breach or a hole is formed on the insulating layer. The first electrode and the second electrode may be contacted through the breach on the insulating layer under the squeeze of the outer housing 210, thereby the first electrode and the second electrode are on-state to generate a signal, and the control system operates the robot according to the signal.

Figure 9:
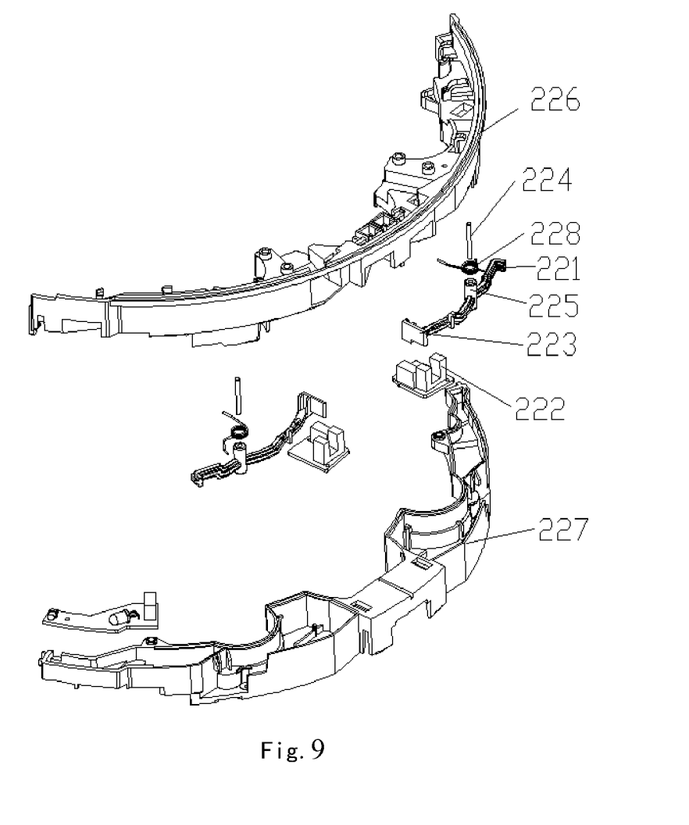
FIG. 9 is an exploded schematic view of a sensing-switch mounting element and a sensing switch of the robot according to an embodiment of the disclosure.

FIG. 8 is an exploded schematic view of the robot according to the embodiment of the disclosure, and FIG. 9 is an exploded schematic view of a sensing-switch mounting element and a sensing switch of the robot. In an embodiment, the sensing switches 220 are disposed on a sensing-switch mounting element 240. The sensing-switch mounting element 240 includes a first mounting bracket 226 and a second mounting bracket 227 opposite to each other. The sensing-switch mounting element 240 may be mounted on the robot main body 1. The sensing-switch mounting element 240 may extend corresponding to the extending track of the outer housing 210. That is, the sensing-switch mounting element 240 spirally extends at least one circle neighbouring to the peripheral edge of the robot main body 1. It can be understood that the sensing-switch mounting element 240 may also be disposed corresponding to a portion of the extending track of the outer housing 210. For example, the sensing-switch mounting element 240 may be disposed on the outer periphery of the front half portion of the robot main body 1. One or more sensing switches 220 are distributed on the sensing-switch mounting element 240. The sensing-switch mounting element 240 and the robot main body 1 are integral. Preferably, a plurality of sensing switches 220 are evenly distributed on the sensing-switch mounting element 240.

Hereafter, the embodiment will be described by taking an example that the sensing-switch mounting element 240 is disposed on the outer periphery of the front half portion of the robot main body 1. The sensing switch 220 includes a contact rod 221, a rotation shaft 224, a spring member 228, a sensing member 222 and a blocking portion 223. The sensing member 222 and the rotation shaft 224 are fixed in the groove of the second mounting bracket 227. The structure of the groove is matching with the shape of the combination of the contact rod 221, the rotation shaft 224, the spring member 228, the sensing member 222 and the blocking portion 223. A shaft sleeve 225 is disposed at a position near or at the center of the contact rod 221. The rotation shaft 224 is sleeved in the shaft sleeve 225, so that contact rod 221 can rotate around the rotation shaft 224. The blocking portion 223 is disposed at one end of the contact rod 221, and the other end of the contact rod 221 is a free end that protrudes to the outside of the robot main body 1. When the outer housing 210 collides, the free end is pressed by the outer housing 210, which makes the contact rod 221 rotate around the rotation shaft 224, then drives the blocking portion 223 to move, so that the blocking portion 223 moves to the sensing member 222 and triggers the sensing member 222 to output a signal. The sensing member 222 may have a transmitter and a receiver, such as an optical transmitter and an optical receiver, an acoustic transmitter and an acoustic receiver. When the blocking portion 223 moves to the sensing member 222, the blocking portion 223 blocks between the transmitter and the receiver for blocking the signal transmission between the transmitter and the receiver, so that the signal receiver outputs a signal different from that at the time of non-collision to the control system. In an embodiment, the sensing member 222 may also be a microswitch. When the blocking portion 223 moves to the sensing member 222, the electronic contacts of the microswitch is turned on to output a signal different from the normal state (non-collision) signal. The spring member 228 is used to make the contact rod 221 resiliently recover and can play a certain buffering role during the collision.

Further, the touch sensing device 200 further includes one or more resilient members for providing the touch sensing device 200 with a buffering effect during the collision and a recovering function after being collided. In an embodiment, the resilient member may be a buffer layer adapted to the shape of the outer housing 210, such as elastic rubber, elastic foam, sponge and foam. In an embodiment, the resilient members may also be a plurality of spring sheets uniformly distributed and adapted to the shape of the outer housing 210.

Figure 7A:
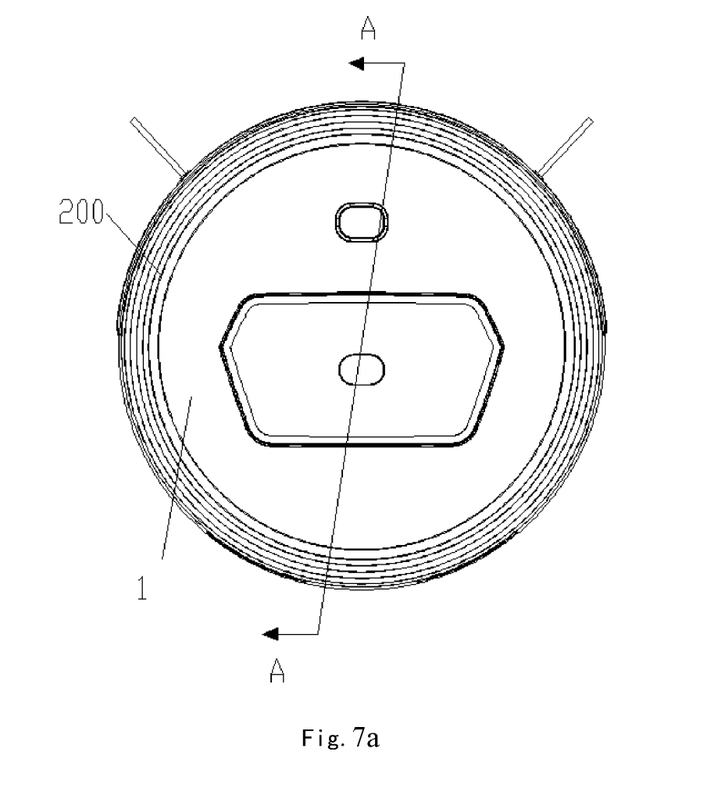
FIG. 7*a* is a schematic top view of the robot according to the embodiment of the disclosure.
Figure 7B:
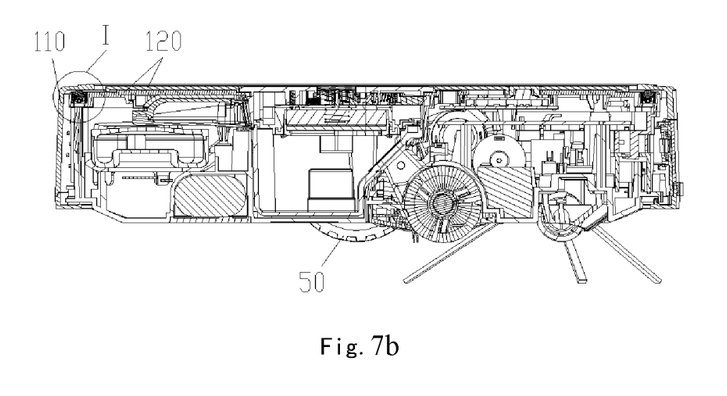
FIG. 7*b* is a schematic cross-section view of the robot in FIG. 7*a* along the section line A-A.
Figure 7C:
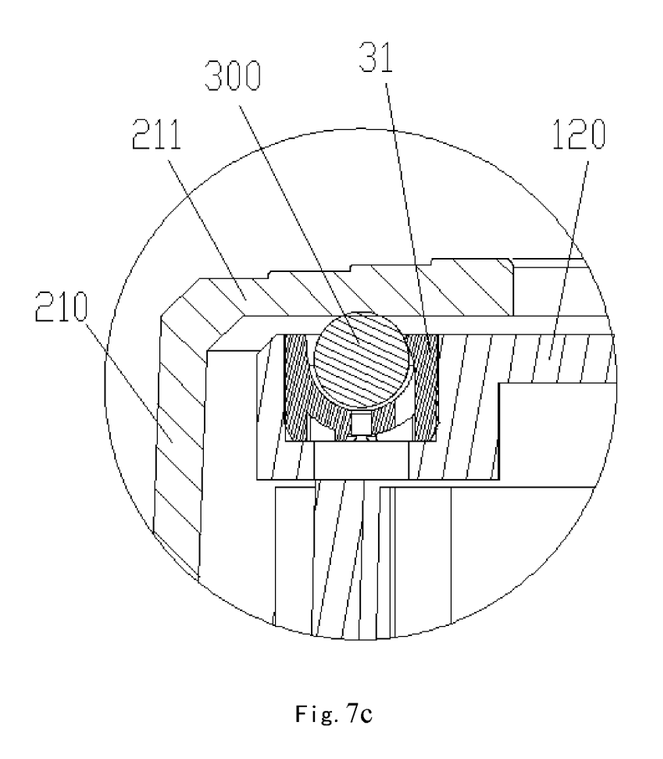
FIG. 7*c* is a schematic enlarged partial view of a portion I in FIG. 7*b*.
Figure 7D:
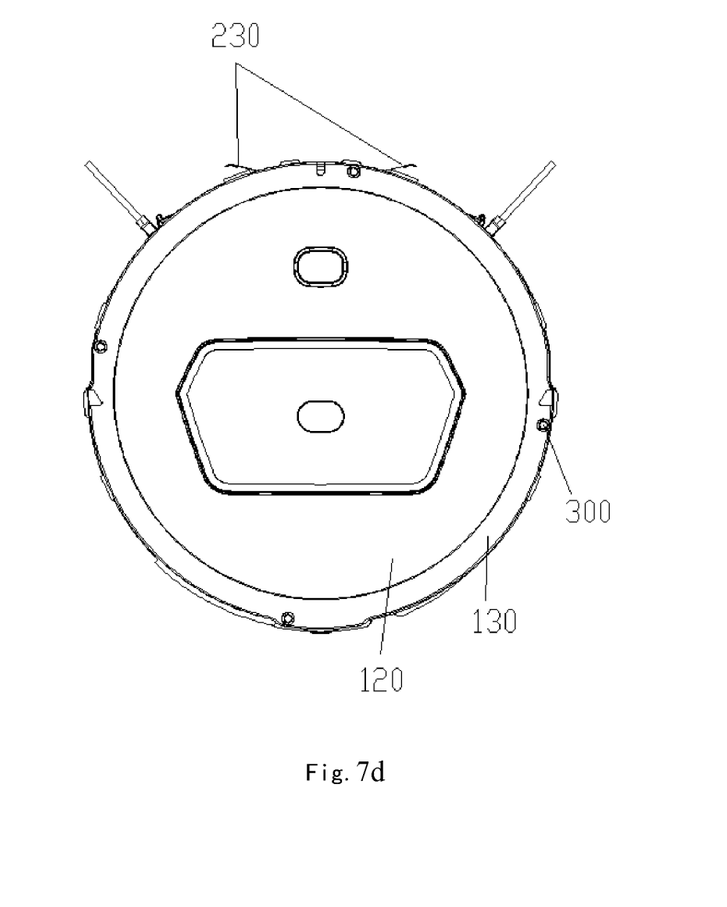
FIG. 7*d* is a schematic view of the robot after the top cover is removed according to the embodiment of the disclosure.

FIG. 7*d* is a schematic view of the robot after the top cover is removed according to the embodiment of the disclosure. In this embodiment, the touch sensing device 200 further includes one or more spring sheets 230. The plurality of spring sheets 230 are disposed around the robot main body 1, for example, the front, the rear, the left, and the right of the robot main body 1 are respectively equipped with one spring sheet. Taking the touch sensing device 200 including one spring sheet as an example. As shown in FIG. 7*d*, the middle part of the spring sheet 230 is fixed on the robot main body 1, and two ends of the spring sheet 230 extend to the outside of the robot main body 1 and are in contact with the inner side of the outer housing 210. When the outer housing 210 collides, the outer housing 210 squeezes the two ends of the spring sheet 230, and the collision is buffered under the spring force of the spring sheet 230. After the collision is canceled, the outer housing 210 returns to its original position under the spring force.

Reference is made to FIGS. 7*a* to 7*d* and FIG. 8, wherein FIG. 7*a* is a schematic top view of the robot according to the embodiment of the disclosure, FIG. 7*b* is a schematic cross-sectional view of the robot in FIG. 7*a* along the section line A-A, FIG. 7*c* is a schematic enlarged partial view of a portion I in FIG. 7*b*, FIG. 7*d* is a schematic view of the robot after the top cover is removed according to the embodiment of the disclosure. In an embodiment of the disclosure, rolling components 300 are disposed between the robot main body 1 and the outer housing 210. The rolling component 300 can roll at an original position in any direction, and is used to reduce the friction force that exists between the outer housing 210 and the robot main body 1 when the outer housing 210 is moved by the collision, so that the outer housing 210 moves more smoothly, thereby reducing wear. A bracket 31 may be disposed under the rolling member 300 for supporting the rolling member 300 so that the rolling member 300 may roll in fixed original place. In an embodiment, the rolling member 300 is a round ball that can roll in all directions in original position. There are a plurality of rolling members 300 evenly distributed between the robot main body 1 and the outer housing 210.

In an embodiment, the bracket 31 may be provided with a small ball group supporting the rolling member 300, and the small ball group is arranged on the inner wall of the bracket 31, so that the rolling member 300 rolls more smoothly. In another embodiment, the bracket 31 accommodates more than half of the volume of the rolling member 300. At least one small protrusion is disposed on the edge of the notch of the bracket 31, and the small protrusion is used for limiting the rolling member 300, so as to prevent the rolling member 300 from dropping from the accommodating cavity of the bracket 31. The bracket 31 may not be provided with the small ball group supporting the roll.

In an embodiment, the outer housing 210 has an extending portion 211 that at least partially overlaps the surface of the robot main body 1 away from the travelling surface of the robot, and the rolling member 300 is disposed between the extending portion 211 and the robot main body 1. Specifically, the robot main body 1 may include a base tray 110 and a top cover 120 which are arranged opposite to each other, and the rolling member 300 is located between the extending portion 211 and the top cover 120. In an embodiment, the robot main body 1 may further include a middle cover 130 under the top cover 120, and the top cover 120 serves as an protection layer and an appearance layer on the upside outer surface of the robot. In an embodiment, the edge of the middle cover 130 extends from the outer periphery of the cover 120. The extending portion 211 is overlapped with the extension of the middle cover 130 with a gap. The rolling member 300 is located between the extending portion 211 and the middle cover 130. In an embodiment, the top cover 120 and the middle cover 130 may be designed to be integral, that is, as an inseparable whole.

In an embodiment, at least a portion of the top cover 120 is connected to the touch sensing device 200, so that the top cover 120 and the touch sensing device 200 can be integrally formed to reduce the times of forming and simplify the forming process, and make the integrality sense to the robot stronger in users' vision. Specifically, the extending portion 211 of the outer housing 210 is integrally formed with the top cover 120. A middle cover 130 is disposed under the top cover 120. Rolling components 300 are disposed between the middle cover 130 and the top cover 120. When the touch sensing device 200 is moved by the collision, the top cover 120 moves together with the outer housing 210 of the touch sensing device 200.

The touch sensing device 200 may also further be provided with various other sensors, such as infrared sensors, laser range sensors and other distance measuring sensors, cameras, optical flow sensors, acoustic sensors and ultrasonic sensors.

In the description of the specification, the reference terms "the first embodiment," "the second embodiment," "the embodiment of the disclosure," "one mode of execution," "a mode of execution," "an embodiment," "an example," "a specific example," "some examples," and the like mean that specific features, structures, materials, or characteristics described accompanying with the embodiment or example are included in at least one embodiment or example of the disclosure. In this specification, the illustrative description of the above terms maybe not refer to the same embodiment or example. Furthermore, the specific features, structures, materials, or characteristics described may be combined in any one or more embodiments or examples in suitable manner.

The above described embodiments should not limit the scope of protection of the technical solutions. All modifications, substitutions and improvements made without departing from the spirit and principle of the above embodiments should be embraced by the appended claims.

What is claimed is:

1. A touch sensing device of a robot, comprising:
an inner housing;
an outer housing, continuously surrounding the inner housing at least at the side face of the inner housing;
at least one resilient member, disposed between the outer housing and the inner housing for maintaining a moving gap between the outer housing and the inner housing; and
at least one sensing switch, disposed between the outer housing and the inner housing for detecting the relative displacement between the outer housing and the inner housing;
wherein the sensing switch comprises:
a swing rod, at least partially lightly attached to the outer housing or the inner housing, and used for completing electronic trigger; and
a spring, acting on the swing rod to help the swing rod recover;
wherein the at least one sensing switch and the at least one resilient member are evenly distributed between the outer housing and the inner housing.

2. The touch sensing device according to claim 1, wherein the at least one resilient member comprises at least one selected from the group consisting of a spring, a elastic sheet and a resilient buffer layer.

3. The touch sensing device according to claim 1, wherein the at least one resilient member comprises:
a sleeve;
a compression spring, disposed in the sleeve; and
a slide rod, one end of which extends into the sleeve for connecting to the compression spring,
wherein both ends of the resilient member are pivotally connected to the outer housing and the inner housing respectively.

4. The touch sensing device according to claim 3, wherein the at least one sensing switches comprise a plurality of sensing switches, which are distributed relative to the outer housing or symmetrically disposed in pair.

5. The touch sensing device according to claim 1, wherein the at least one resilient members comprises a plurality of resilient members, which are symmetrically disposed on both sides of the longitudinal axis of the robot.

6. The touch sensing device according to claim 5, wherein the angle formed by the resilient members on both sides of the longitudinal axis of the robot is a reflex angle, and the orientation of the reflex angle is the front of the robot.

7. The touch sensing device according to claim 1, wherein the outer housing forms at least one circle surrounding the inner housing and the outer housing is integrally formed to a ring.

8. A robot, comprising:
a robot main body;
a walking device, disposed on the robot main body; and
a touch sensing device, comprising:
an inner housing;
an outer housing, continuously surrounding the inner housing at least at the side face of the inner housing;
at least one resilient member, disposed between the outer housing and the inner housing for maintaining a moving gap between the outer housing and the inner housing; and
at least one sensing switch, disposed between the outer housing and the inner housing for detecting the relative displacement between the outer housing and the inner housing;
wherein the sensing switch comprises:
a swing rod, at least partially lightly attached to the outer housing or the inner housing, and used for completing electronic trigger; and
a spring, acting on the swing rod to help the swing rod recover;
wherein the at least one sensing switch and the at least one resilient member are evenly distributed between the outer housing and the inner housing.

9. The robot according to claim 8, wherein the robot main body comprises a base tray and a top cover which are arranged opposite to each other, and the inner housing of the touch sensing device is disposed on the base tray or integrally formed with the base tray.

10. The robot according to claim 8, wherein the robot main body comprises a base tray and a top cover which are arranged opposite to each other, and the top cover is arranged to: when the outer housing of the touch sensing device is colliding with an obstacle, the top cover is movable together with the outer housing of the touch sensing device.

11. The robot according to claim 8, wherein the robot main body comprises a base tray and a top cover arranged opposite to each other, and the top cover is integrally formed with the outer housing of the touch sensing device.

12. The robot according to claim 8, wherein a rolling component is disposed between the robot main body and the outer housing of the touch sensing device, and reduces frictional force with the robot main body when the outer housing is moving.

13. The robot according to claim 12, wherein the rolling component is a round ball rollable in all directions in original position.

14. The robot according to claim 8, wherein the robot main body comprises a base tray and a top cover which are arranged opposite to each other, and the inner housing of the touch sensing device is disposed on the base tray or integrally formed with the base tray, the outer housing of the touch sensing device surrounds the robot main body at least one circle to form a ring shape or spiral shape.

15. The robot according to claim 14, wherein the at least one resilient member and/or the at least one sensing switch respectively comprise a plurality of resilient members and/or a plurality of sensing switches evenly distributed on one side of the outer housing close to the inner housing,
    wherein the plurality of sensing switches are at least disposed on a front portion of the robot, and the plurality of resilient members are at least disposed on the front portion of the robot.

16. The robot according to claim 8, wherein the at least one resilient member comprises:
    a sleeve;
    a compression spring, disposed in the sleeve; and
    a slide rod, one end of which extends into the sleeve for connecting to the compression spring;
    wherein both ends of the resilient member are pivotally connected to the outer housing and the inner housing respectively.

17. The robot according to claim 8, wherein the angle formed by the at least one resilient members on both sides of the longitudinal axis of the robot is a reflex angle, and the orientation of the reflex angle is the front of the robot.

* * * * *